United States Patent
San Miguel et al.

(10) Patent No.: US 10,877,798 B2
(45) Date of Patent: Dec. 29, 2020

(54) SCALABLE TECHNIQUES FOR EXECUTING CUSTOM ALGORITHMS ON MEDIA ITEMS

(71) Applicant: NETFLIX, INC., Los Gatos, CA (US)

(72) Inventors: Francisco J San Miguel, San Jose, CA (US); Naveen Mareddy, San Ramon, CA (US); Rick Wong, Los Altos, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/116,842

(22) Filed: Aug. 29, 2018

(65) Prior Publication Data
US 2019/0065252 A1    Feb. 28, 2019

Related U.S. Application Data

(60) Provisional application No. 62/553,024, filed on Aug. 31, 2017.

(51) Int. Cl.
G06F 9/48        (2006.01)
G06F 9/455       (2018.01)

(52) U.S. Cl.
CPC ........ G06F 9/4881 (2013.01); G06F 9/45533 (2013.01)

(58) Field of Classification Search
CPC .......... H04N 21/2343; H04N 21/44016; G06F 16/116; G06F 16/182; G06F 16/70
See application file for complete search history.

(56) References Cited

U.S. PATENT DOCUMENTS

| | | | |
|---|---|---|---|
| 2014/0068560 A1* | 3/2014 | Eksten | G06F 9/5066 717/120 |
| 2014/0122664 A1* | 5/2014 | Clarke | H04L 65/605 709/219 |
| 2015/0125133 A1* | 5/2015 | Kim | H04N 19/40 386/326 |
| 2015/0244758 A1* | 8/2015 | Kolowich | H04L 67/2842 709/231 |
| 2016/0337675 A1* | 11/2016 | Mutton | H04N 19/40 |
| 2016/0342688 A1* | 11/2016 | Fang | G11B 27/10 |

(Continued)

OTHER PUBLICATIONS

International Search Report for application No. PCT/US2018/049220 dated Dec. 17, 2018.

(Continued)

*Primary Examiner* — Dong U Kim
(74) *Attorney, Agent, or Firm* — Artegis Law Group, LLP

(57) ABSTRACT

In various embodiments, a workflow engine executes a custom algorithm on a media item. In operation, the workflow engine generates split specifications based on a split function included in a container image. Each split specification is associated with a different portion of the media item. Subsequently, the workflow engine generates map output files based on the split specifications and a map function included in the container image. The workflow engine then generates one or more final output file(s) based on the map output files and a collect function included in the container image. The final output file(s) are subsequently used to perform at least one of an evaluation operation on, a modification operation on, and a representation operation with respect to the media item.

20 Claims, 4 Drawing Sheets

(56) References Cited

U.S. PATENT DOCUMENTS

2017/0034023 A1* 2/2017 Nickolov ............ H04L 43/0817

OTHER PUBLICATIONS

Dean et al., "MapReduce: Simplified Data Processing on Large Clusters", Communications of the ACM, vol. 51, No. 1, Jan. 1, 2008, 13 pages.
Radhakrishnan, Regunathan, "Using Hadoop MapReduce for Distributed Video Transcoding", Dec. 16, 2013, URL:https://content.pivotal.io/blog/usinghadoop-mapreduce-for-distributed-video-transcoding, 5 pages.
Tan et al., "An approach for fast and parallel video processing on Apache Hadoop clusters", 2014, IEEE International Conference on Multimedia and Expo (ICME), Jul. 14, 2014, 6 pages.
Murthy, Arun, "Apache Hadoop YARN—Concepts and Applications—Hortonworks", URL: https://hortonworks.com/blog/apache-hadoop-yarn-concepts-and-applications, Aug. 15, 2012, 7 pages.
Anonymous: "Operating—system-level virtualization—Wikipedia", Aug. 18, 2017, URL:https://en.wikipedia.org/w/index.php?title=Operating-system-level virtualization&oldid=796132134, 3 pages.
Anonymous: "Docker Moby Documentation GitHub", URL:https://github.com/moby/moby/blob/dffa5d6df2e51556edfbcebc4695fdbc0bccla90/docs/api/v1.18.md, Aug. 19, 2017, 31 pages.
Park et al., "Creating Your Own EC2 Spot Market", https://netflixtechblog.com/creating-your-own-ec2-spot-market-6dd001875f5, Sep. 28, 2015, 4 pages.
"Creating Your Own EC2 Spot Market—Part 2", https://netflixtechblog.com/creating-your-own-ec2-spot-market-part-2-106e53be9ed7, Nov. 23, 2015, 8 pages.
Stenberg, Jan, "Microservices Ending up as a Distributed Monolith", https://www.infoq.com/news/2016/02/services-distributed-monolith/, Feb. 24, 2016, 2 pages.
Bottcher, Evan, "What I Talk About When I Talk About Platforms", https://martinfowler.com/articles/talk-about-platforms.html, Mar. 5, 2018, 14 pages.
Joshi et al., "Titus, the Netflix container management platform, is now open source", https://netflixtechblog.com/titus-the-netflix-container-management-plafform-is-now-open-source-f868c91b5436, Apr. 18, 2018, 7 pages.
"The Evolution of Container Usage at Netflix", https://netflixtechblog.com/the-evolution-of-container-usage-at-netflix-3abfc096781b, Apr. 19, 2017, 6 pages.

* cited by examiner

SCALABLE TECHNIQUES FOR EXECUTING CUSTOM ALGORITHMS ON MEDIA ITEMS

CROSS-REFERENCE TO RELATED APPLICATIONS

This application claims the priority benefit of the United States Provisional Patent Application title, "Media Innovation Platform," filed on Aug. 31, 2017 and having Ser. No. 62/553,024. The subject matter of this related application is hereby incorporated herein by reference.

BACKGROUND

Field of the Various Embodiments

Embodiments of the present invention relate generally to media processing platforms and, more specifically, to scalable techniques for executing custom algorithms on media items.

Description of the Related Art

Oftentimes custom algorithms are incorporated into scalable applications that enable the custom algorithms to be run in a high-throughput fashion. In such implementations, an incorporated custom algorithm is made up of a series of steps, while the associated scalable application is made up of a set of instructions that configures multiple compute instances to perform the series of steps making up the incorporated custom algorithm. In a more particular implementation, a "scalable media" application includes additional instructions that allow the scalable media application to effectively execute the custom algorithm on media items in a high-throughput fashion to achieve one or more objectives. For example, a computer vision custom algorithm could be incorporated into a marketing application that analyzes the different movies included in a media content library to identify the most compelling action shots involving popular actors or actresses. In another example, a subtitle timing custom algorithm could be incorporated into a quality assurance application that automatically detects subtitle timing errors in the different movies included in the media content library.

Building a scalable media application that can reliably and efficiently execute a custom algorithm in a high-throughput fashion is typically a complex and difficult process. Usually, a software engineer has to ensure that the scalable media application meets scope, efficiency, and security requirements associated with the large-scale distributed processing of potentially proprietary media items. To do so, the software engineer has to design the scalable media application to securely and efficiently acquire media items in a wide variety of media formats, securely generate and distribute tasks across multiple "worker" compute instances for concurrent processing via the custom algorithm, and securely store the final output of the scalable media application. Accordingly, developing a scalable media application requires significant manual effort as well as technical know-how related to the incorporated custom algorithm(s), dynamic workflows, media processing techniques, such as encoding and decoding, secure communication techniques, and resource allocation and load balancing techniques. A lack of knowledge in one or more of these areas can prevent a software developer from being able to properly incorporate a custom algorithm into a scalable media application altogether. While a software developer likely could generate a prototype application that could meet more limited processing requirements involving a given custom algorithm, such a prototype application most likely would not be able to meet the more demanding processing requirements related to the distributed processing of proprietary media items.

Certain conventional processing platforms exist that can be used to reduce the manual effort and amount of technical know-how required to successfully incorporate custom algorithms into scalable media applications. For instance, some video streaming service providers implement internal media processing platforms that provide a secure interface to a media content library, media processing tools, a load rebalancing subsystem, and a secure storage subsystem. One drawback of these types of media processing platforms, though, is that the media processing platform and the associated applications constitute a "distributed monolith." In a distributed monolith, changes to one application or service oftentimes requires changes to other applications and services. Consequently, modifying a scalable media application that uses such a platform is possible only when the entire media processing platform is rebuilt.

To enable more flexible updates to scalable media applications, a software developer could implement the scalable media application using a generalized distributed computing framework. Each scalable media application that uses a generalized distributed computing framework is independently built and exists separately and independently of other scalable media applications that use the generalized distributed computing framework. Thus, a scalable media application that uses the generalized distributed computing framework does not need to be rebuilt when another application that uses the generalized distributed computing framework is modified. One drawback of this approach, however, is that ensuring that each worker compute instance managed via the distributed computing framework provides the proper execution environment for a given scalable media application is quite difficult, if not impossible. For example, if two different scalable media applications were to require conflicting operating system (OS) dependencies, then a given worker compute instance managed via the distributed computing framework would be unable to properly execute at least one of the scalable media applications. Another drawback is that developing scalable media applications using a generalized distributed computing framework also requires in-depth technical knowledge of media processing techniques, which, as discussed above, can create a substantial technical hurdle for many software developers.

As the foregoing illustrates, what is needed in the art are more effective techniques for executing custom algorithms on media items in a high-throughput fashion.

SUMMARY

One embodiment of the present invention sets forth a computer-implemented method for executing custom algorithms on media items. The method includes generating multiple split specifications based on a split function included in a container image, where each split specification is associated with a different portion of a media item; generating multiple map output files based on the plurality of split specifications and a map function included in the container image; and generating one or more final output files based on the map output files and a collect function included in the container image, where the one or more final output files are subsequently used to perform at least one of an evaluation operation on, a modification operation on, and a representation operation with respect to the media item.

At least one technical advantage of the disclosed techniques relative to prior art solutions is that, with the disclosed techniques, custom algorithms can be more easily and reliably executed on media items via distributed computing resources. In particular, the disclosed techniques provide a split-map-collect workflow that is capable of executing custom algorithms on media items in a high-throughput fashion using containers that include the proper operating systems (OS) dependencies. In addition, the disclosed techniques automatically perform media and security operations that reduce the amount of manual design effort and technical knowledge required to securely and successfully execute the custom algorithm on a wide range of potentially proprietary media items. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
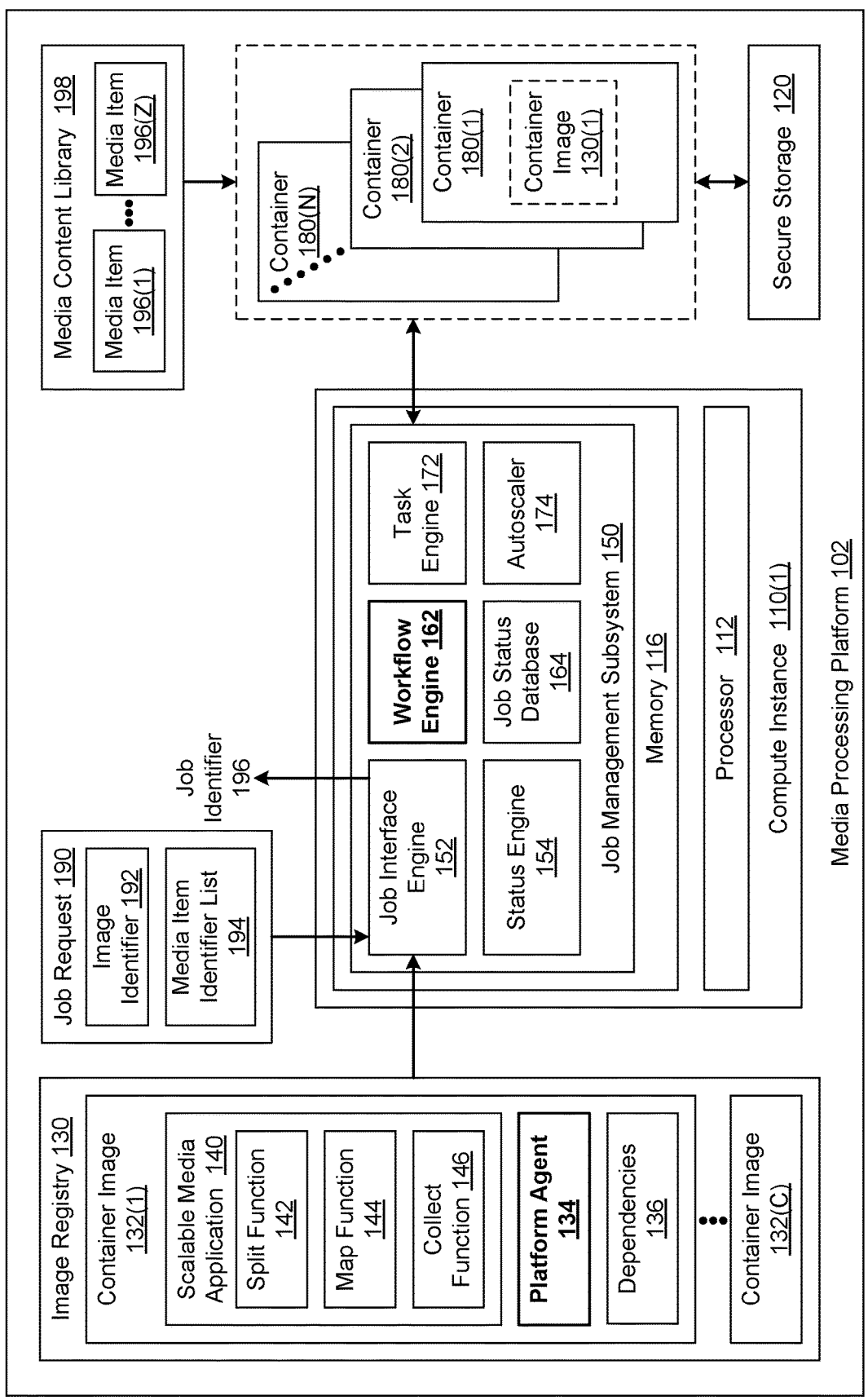
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

Many media providers have media content libraries that include numerous media items. Each media item includes any amount and type of content associated with any media format in any technically feasible fashion. Examples of media items include, without limitation, an MPEG-4 video file that includes a source video sequence and an H.264 encoded video file that includes an encoded video sequence. A video streaming service provider could have a media content library that, for each of thousands of video titles, includes an MPEG-4 video file and multiple H.264 encoded video files.

Oftentimes, to achieve one or more objectives in a high-throughput fashion, the media provider develops a custom algorithm, incorporates the custom algorithm into a scalable media application, and then executes the scalable media application on media items included in the media content library. The incorporated custom algorithm is made up of a series of steps, while the associated scalable media application includes additional instructions that configure numerous compute instances to perform the series of steps on the media items. Some examples of objectives include, without limitation, A/B testing, catalog-wide re-encoding, watermarking frames included in video sequences, selecting compelling images or sequences of frames for advertising purposes, and detecting subtitle timing errors.

In a conventional system, building a scalable media application that can reliably and efficiently execute a custom algorithm in a high-throughput fashion is typically a complex process. For example, in some conventional systems, a software engineer has to design the scalable media application to securely and efficiently acquire media items in a wide variety of media formats, securely generate and distribute tasks across multiple "worker" compute instances for concurrent processing via the custom algorithm, and securely store the final output of the scalable media application. Accordingly, developing a scalable media application requires significant manual effort as well as technical know-how related to the incorporated custom algorithm, dynamic workflows, media processing techniques (e.g., encoding, decoding, etc), secure communication techniques, and resource allocation and load balancing techniques. A lack of knowledge in one or more of these areas can prevent a software developer from being able to properly incorporate a custom algorithm into a scalable media application that can be efficiently executed across a relatively large media content library.

Certain conventional media processing platforms exist that can be used to reduce the manual effort and amount of technical know-how required to successfully incorporate custom algorithms into scalable media applications. One drawback of these types of conventional media processing platforms, though, is that the conventional media processing platform and the associated applications typically constitute a "distributed monolith." In a distributed monolith, changes to one application or service oftentimes requires changes to other applications and services. Consequently, modifying a scalable media application that uses such a platform is possible only when the entire platform is rebuilt. As a result, changes to a given custom algorithm may take days or weeks to become available via the associated scalable media application.

To enable more flexible updates to scalable media applications, a software developer could implement the scalable media application using a generalized distributed computing framework. Generalized distributed computing frameworks allow applications that use the framework to be modified and built independently of the framework and other applications that use the framework. One drawback of this approach, however, is that ensuring that each worker compute instance managed via the distributed computing framework provides the proper execution environment for a given scalable media application is quite difficult, if not impossible. Another drawback is that developing scalable media applications using a generalized distributed computing framework also requires in-depth technical knowledge of media processing techniques, which, as discussed above, can create a substantial technical hurdle for many software developers.

With the disclosed techniques, however, a job management subsystem and an associated platform agent reduce the amount of technical knowledge required to execute a custom algorithm in a high-throughput fashion while ensuring the proper execution environment for the custom algorithm. In general, the job management subsystem and the platform agent implement any number of conventional techniques to securely and efficiently acquire media items from the media content library, correctly interpret a wide variety of media formats, securely generate and distribute tasks across multiple worker compute instances, and secure store the results produced by the scalable media applications. Unlike a typical conventional processing platform, however, the job management subsystem drives a workflow optimized for media items that uses stand-alone executable instances of code referred to as "containers."

A custom algorithm is incorporated into a scalable media application that includes, without limitation, three functions: a split function, a map function, and a collect function. The split function partition one or more media titles into smaller units or "splits." The map function applies the custom algorithm to a given split. The collect function combines the results of applying the custom algorithm to all of the splits. The scalable media application, the platform agent, and any operating system dependencies are combined to create a container image. A "container image" is a static file including stand-alone executable code that provides an independent package of software including, without limitation, any number of applications and the associated dependencies. When executed on a compute instance, the container image generates a "container" that provides the dependencies and can execute any included applications. For explanatory purposes, a container generated from a container image that includes a given scalable media application is "associated" with the scalable media application.

Upon receiving a job request specifying a container image and a list of one or more media items, a workflow engine included in the job management subsystem generates a split task specifying the one or more media items. In response to the split task, a platform agent included in an associated container acquires the media item(s) from the content media library. The platform agent then executes the split function on the media item(s) to determine the splits. Subsequently, the workflow engine generates a different map task for each split. Each map task is processed by a platform agent included in a potentially different associated container. Accordingly, any number of associated containers may process the map tasks concurrently, sequentially, or in any combination thereof. In response to a given map task, the platform agent executes the map function on the portion(s) of the media item(s) associated with the split. Importantly, the platform agent ensures that the appropriate portions(s) of the media item(s) are available for processing via the map function for a variety of different media formats. The platform agent then stores the results of the map function in secure storage. After all the map tasks associated with the job have finished executing, the workflow engine generates a collect task. In response to the collect task, a platform agent included in an associated container executes the collect function on the results of the different map functions and then stores the results of the collect function in secure storage.

Advantageously, the job processing platform and the associated platform agent address various drawbacks of executing custom algorithms on media items via conventional scalable media applications and conventional processing platforms. Incorporating custom algorithms into containers that include the proper OS dependencies enables reliable execution of the custom algorithms and isolates the custom algorithms associated with one container from changes to other custom algorithms associated with other containers. The pre-defined split-map-collect workflow automatically provides opportunities for concurrent execution of the custom algorithm on different portions of the source media items. In addition, the job processing platform and the associated platform agent provide functionality that reduce the amount of manual design effort and technical knowledge required to securely and successfully execute the custom algorithm on a wide range of potentially proprietary media items. These technical advantages provide one or more technological advancements over the prior art.

System Overview

FIG. 1 is a conceptual illustration of a system 100 configured to implement one or more aspects of the present invention. As shown, the system 100 includes, without limitation, a media content library 198, a secure storage 120, any number of compute instances 110, an image registry 130, any number of containers 180, and a job request 190. For explanatory purposes, multiple instances of like objects are denoted with reference numbers identifying the object and parenthetical numbers identifying the instance where needed.

In various embodiments, any number of the components of the system 100 may be distributed across multiple geographic locations or implemented in one or more cloud computing environments (i.e., encapsulated shared resources, software, data, etc.) in any combination. In alternate embodiments, the system 100 may include any number of media content libraries 190, any amount and type of secure storage 120, any number of image registries 130, and any number of job requests 190.

The media content library 198 includes, without limitation, any number of media items 196. Each media item 196 includes any amount and type of video content, encoded video content, audio content, encoded audio content, and text content in any combination and using any media format. Some examples of media items 196 include, without limitation, an MPEG-4 video file that includes a source video sequence, an H.264 encoded video file that includes an encoded video sequence, a Windows Media Audio file that includes a source audio sequence, and a text file that includes text content.

The secure storage 120 includes any amount and type of memory resources that are capable of securely storing data. For instance, in some embodiments, the secure storage 120 is managed by a secure storage subsystem and stores data in an encrypted form. In various embodiments, the secure storage 120 may be replaced by any type of storage that is implemented in any technically feasible fashion. For instance, the secure storage 120 could be replaced by any amount and type of cloud-based memory resources that stores any amount and type of data in any form.

As shown for the compute instance 110(1), each compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each compute instance 110 is configured to implement one or more applications or subsystems of applications. Further, as described in detail below, each compute instance 110 may implement one or more containers 180 that each executes any number of applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110(1) enables the system 100 to execute custom algorithms (not shown in FIG. 1) on media items 196 in a high-throughput fashion. In general, efficiently and reliably executing a custom algorithm on media items in a high-throughput fashion is a complex process that involves incorporating the custom algorithm into a scalable media application. As referred to herein, an incorporated custom algorithm is made up of a series of steps, while the associated scalable application is made up of a set of instructions that configures multiple compute instances to perform the series of steps making up the incorporated custom algorithm.

In many conventional systems, developing a conventional scalable media application requires significant manual effort as well as technical know-how related to the incorporated custom algorithm(s), dynamic workflows, media processing techniques, such as encoding and decoding, secure communication techniques, and resource allocation and load balancing techniques. A lack of knowledge in one or more of these areas can prevent a software developer from being able to properly incorporate a custom algorithm into a conventional scalable media application altogether.

Certain conventional media processing platforms exist that can be used to reduce the manual effort and amount of technical know-how required to successfully incorporate custom algorithms into scalable media applications. As persons skilled in the art will recognize, one drawback of these types of conventional media processing platforms, though, is that changes to one application or service that uses the platform oftentimes requires changes to other applications and services that use the platform. Consequently, modifying a conventional scalable media application that uses such a platform is possible only when the entire conventional media processing platform is rebuilt.

To enable more flexible updates to conventional scalable media applications, a software developer could implement the conventional scalable media application using a generalized distributed computing framework. As persons skilled in the art will recognize, an application that uses a generalized distributed computing framework does not necessarily need to be rebuilt when another application that uses the generalized distributed computing framework is modified. One drawback of this approach, however, is that ensuring that each worker compute instance managed via the distributed computing framework provides the proper execution environment for a given application is quite difficult, if not impossible. Another drawback is that developing conventional scalable media applications using a generalized distributed computing framework also requires in-depth technical knowledge of media processing techniques, which, as discussed above, can create a substantial technical hurdle for many software developers.

Executing Custom Algorithms on Media Items Using Containers

To address the above problems, the system 100 includes, without limitation, a job management subsystem 150 and a platform agent 134 that, together, establish a split-map-collect workflow using containers. The split-map-workflow enables concurrent processing of each media item 196. The job management subsystem 150 resides in the memory 116 of the compute instance 110(1) and executes on the processor 112 of the compute instance 110(1). The platform agent 134 is an interface between the job management subsystem 150 and the scalable media application 140. For explanatory purposes only, the combination of the job management subsystem 150 and the platform agent 134 are also referred to herein as the "job management platform." Notably, in various embodiments, the job management platform may treat (e.g., operates on, processes, etc) any media-related object as a first class object. For instance, in some embodiments, the job management platform treats frames as first class objects for video content and channels as first class objects for audio content.

As persons skilled in the art will recognize, each container 180 is a stand-alone executable instance of code that is generated when a container image 132 is run on a compute instance 110. As shown, the system 100 includes an image registry 130 that includes, without limitation, any number of container images 132. Each container image 132 is a static file that includes stand-alone executable code. The stand-alone executable code provides an independent package of software including, without limitation, the platform agent 134, a scalable media application 140, and dependencies 136. The dependencies 136 include, without limitation, operating system dependencies and language-specific dependencies that provide a runtime environment for the platform agent 134 and the scalable media application 140.

When run on a compute instance 110, the container image 132 generates the container 180 that provides the dependencies 136 and can execute the platform agent 134 and the scalable media application 140. As referred to herein, the container 180 generated from the container image 132 that includes a given scalable media application 140 is "associated" with the scalable media application 140. Any number of compute instances 110 may implement containers 180. Further, each compute instance 110 may simultaneously implement any number of containers 180 associated with any number of container images 132.

As shown, the scalable media application 140 includes, without limitation, a split function 142, a map function 144, and a collect function 146. The split function 142 partitions media item(s) 196 into smaller units or "splits." The map function 144 applies an associated custom algorithm to a given split. The collect function 146 combines the results of applying the associated custom algorithm to all of the splits. Notably, the platform agent 134 provides any number and type of built-in functions that the scalable media application 140 can use. Each of the split function 142, the map function 144, and the collect function 146 can be a custom function or a built-in function provided by the platform agent 134.

One exemplary custom split function 142 generates a first split that includes the first 5 minutes of a media item 196(5)

and a second split that includes the last 3 minutes of the media item 196(5). Another exemplary custom split function 142 generates the splits based on the media item 196(1) that is a source video sequence for a particular move and the media item 196(2) that is an encoded video sequence for the movie. A first split includes uncompressed and decoded versions of the $102^{nd}$ frames of the media items 196(1) and 196(2), and a second split includes uncompressed and decoded versions of the $2099^{th}$ frames of the media items 196(1) and 196(2). One example of a built-in split function 142 is a time-based splitter that partitions the media item 196(x) based on runtime associated with the media item 196(x) Another example of a built-in split function 142 is a shot-based splitter that partitions the media item 196(x) into shot sequences based on shot change data. Each shot sequence includes a set of frames that usually have similar spatial-temporal properties and run for an uninterrupted period of time.

One example of a built-in map function 144 performs no operations and is used to create a scalable media application 140 that executes the split function 142 and the collect function 146 without applying a custom algorithm to each split. An example of a built-in collect function 146 is a Zip file collector that collects map output files generated by the map functions 144 based on the different splits into a single Zip file. Another example of a built-in collect function 146 is a concatenation collector that byte concatenates the contents of the map output files generated by the map functions 144 based on the different splits in an ordering associated with the splits. In alternate embodiments, any number and type of built-in functions in any combination may be acquired and used in the scalable media application 140 in any technically feasible fashion.

The split function 142, the map function 144, and the collect function 146 may be defined in any technically feasible fashion and in any language. For instance, in some embodiments, the input to the split function 142 is one or more media items 196 and the output of the split function 142 is a split specification file written in JavaScript Object Notation (JSON). For video sources, the split specification file includes boundaries of each split represented by start and end frame numbers. Each split is identified by a unit split identifier. The split specification file also allows specification of overlaps between consecutive splits.

The platform agent 134 acquires tasks (i.e., discrete portions of work) for execution by the scalable media application 140, performs pre-processing operations on files that are operated on by the scalable media application 140, invokes the functions included in the scalable media application 140, and performs post-processing operations on results generated by the scalable media application 140. The platform agent 134 may acquire tasks in any technically feasible fashion. For instance, in some embodiments, the platform agent 134 monitors one or more durable priority queues for tasks. The pre-processing operations and the post-processing operations may include any number and type of security-related operations, media processing operations, formatting operations, and so forth.

For instance, in some embodiments, the platform agent 134 securely acquires an encoded video sequence from the media content library 198, decodes the encoded video sequence, and securely uploads the frames corresponding to a split to the secure storage 120. In the same or other embodiments, the platform agent 134 encrypts the results produced by the scalable media application 140, securely uploads the encrypted results to the secure storage 120 as final output files, removes any temporary files and directories created by the scalable media application 140, and notifies the job management subsystem 150 when tasks are completed. In some embodiments, the platform agent 134 performs additional operations, such as collecting and reporting usage metrics and automatically converting video sequences to JPEG or Portable Network Graphics (PNG) images.

As shown, the job management subsystem 150 includes, without limitation, a job interface engine 152, a status engine 154, a workflow engine 162, a job status database 164, a task engine 172, and an autoscaler 174. The job interface engine 152 is an externally-facing component that enables other applications and users to submit and manage job requests 190. The job interface engine 152 may be implemented in any technically feasible fashion. For instance, in some implementations, the job interface engine 152 hosts any number of Representational State Transfer (REST) application programming interfaces (APIs).

Each job request 190 includes, without limitation, an image identifier 192 and a media item identifier list 194. The image identifier 192 uniquely identifies one of the container images 132 included in the image registry 130. The media item identifier list 194 includes any number of media item identifiers (not shown). Each media item identifier uniquely identifies one of the media items 196 included in the media content library 198. In various embodiments, the job request 190 may specify any amount of additional information relevant to the requested work in any technically feasible fashion. In alternate embodiments, the job request 190 may specify the container image 132 and any number of the media items 196 in any technically feasible fashion. For instance, in some embodiments, the job request 190 may specify a remote file location for the media item 196(x). In such embodiments, the media item 196(x) is not necessarily included in the media content library 198.

Upon receiving a job request 190(x) associated with a user, the job interface engine 152 generates a new job (not shown). As part of generating the new job, the job interface engine 152 obtains the container image 132(z) from the image registry 130 based on the image identifier 192. The job interface engine 152 then provides a job identifier 196 that uniquely identifies the new job to the user.

After the job interface engine 152 generates a new job, the workflow engine 162 executes the job. To execute the job corresponding to the job request 190(x), the workflow engine 192 drives a split-map-collect workflow (not shown in FIG. 1) based on the container image 132(z) and the media item identifier list 194. More specifically, the workflow engine 192 executes the workflow for the media items(s) 198 specified via the media items identifier list 194 using any number of the containers 180 associated with the container image 132(z). Each job includes, without limitation, one split task followed by N map tasks (where N is the total number of splits), followed by one collect task.

First, the workflow engine 162 generates a split task specifying the media item list identifier 194. The workflow engine 162 then causes the platform agent 132 included in a container 180 associated with the container image 132(z) to execute the split task using the split function 142. As part of executing the split task, the platform agent 132 obtains the media item(s) 196 from the media component library 198 based on the media item list identifier 194. In alternate embodiments, the job request 190 may specify any number of media items 196 and the platform agent 132 may acquire the media item(s) 196 in any technically feasible fashion For instance, in some embodiments, the job request 190 may specify a file location(s) for any number of media items 196 and the platform agent 132 may obtain the media item(s) 196 based on the file location(s).

After the split task has finished executing, the workflow engine 162 generates a different map task for each of the splits determined by the split task. For each map task, the workflow engine 162 causes the platform agent 132 included in a potentially different container 180 associated with the container image 132(z) to execute the map task using the map function 144. Any number of containers 180 may execute any number of map tasks sequentially, concurrently, or in any combination thereof.

After all of the map tasks have finished executing, the workflow engine 162 causes the platform agent 132 included in one of the containers 180 associated with the container image 132(x) to execute the collect task using the collect function 146. The workflow engine 162 may determine that all the map tasks have finished executing in any technically feasible fashion. For instance, in some embodiments, executing a given map task generates one or more associated map output files, and the workflow engine 172 considers the map tasks to have finished executing when the map output files have been successfully generated. In other embodiments, the workflow engine 172 determines whether the map tasks have finished executing based on messages that pass between the workflow engine 172 and the containers 180. In general, the collect task generates one or more final output files. The final output file(s) are subsequently used to perform at least one of an evaluation operation on, a modification operation on, and a representation operation with respect to the media item(s) 196 associated with the job.

The workflow engine 162 may cause the different instances of the platform agent 132 included in different containers 180 to execute tasks in any technically feasible fashion. For instance, in some embodiments, the workflow engine 162 uses the task engine 172 to cause the different instances of the platform agent 132 to execute tasks. The task engine 172 is a priority-based messaging system that sends tasks to containers 130 and provides additional functionality, such as platform level implicit retries. To execute a task, the workflow engine 162 adds the task to one of any number of durable priory queues managed by the task engine 172.

The autoscaler 174 understands application weights and distributes available compute resources across active scalable media applications 140 based on the associated weights and loads. To assign a compute instance 110 to a given scalable media application 140, the autoscaler 174 runs the container image 132 associated with the scalable media application 140 on the compute instance 110. Importantly, if the autoscaler 174 detects that there are no containers 130 associated with a scalable media application 140(x) for which a task is outstanding, then the autoscaler 174 runs the container image 180(x) that includes the scalable media application 140(x) to generate a new container 130.

In alternate embodiments, any component included in the system 100 may perform any amount and type of resource management and/or container management operations in any technically feasible fashion. For instance, in some embodiments, the workflow engine 162 distributes compute resources between active scalable media applications 140, generates the containers 130, and transmits tasks directly to the different instances of the platform agents 134.

The job status database 164 stores the state of the jobs based on the job identifiers 192. The state of each job indicates the current step in the workflow and the current status (e.g., executing, pending, finished, failed) of the tasks that are associated with the current step. For example, the state of a given job could be that the job is at the map step and the map tasks associated with 200 of 500 splits have successfully finished. The workflow engine 162 uses the job status database 164 to drive the split-map-collect workflow for each job, and the status engine 154 uses the job status database 164 to provide job status to users.

The status engine 154 is a user interface application that enables users to determine the status of each job using the associated job identifier 196. The status engine 154 may provide the status of each job in any technically feasible fashion and at any level of granularity. In some embodiments, the status engine 154 is a GUI that graphically depicts the progress of each job broken into the split, map, and collect steps. In the same or other embodiments, the status engine 154 graphically displays a list of executing, pending, finished, and failed tasks.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to driving a split-map-collect workflow that uses any number of containers 180 to execute custom algorithms on media items 196.

For instance, in alternate embodiments, the workflow engine 162 may cause the containers 180 to execute the split function 142, the map function 144, and the collect function 146 in any technically feasible fashion that is consistent with the split-map-collect workflow. Further, in some alternate embodiments, the functionality of the applications and components included in the system 100 as described herein may be distributed across any number of other applications and components that may or may not be included in the system 100. For instance, any amount of the functionality of the platform agent 134 and the task engine 172 may be subsumed into the workflow engine 162.

Automatically Executing the Split-Map-Collect Workflow

Figure 2:
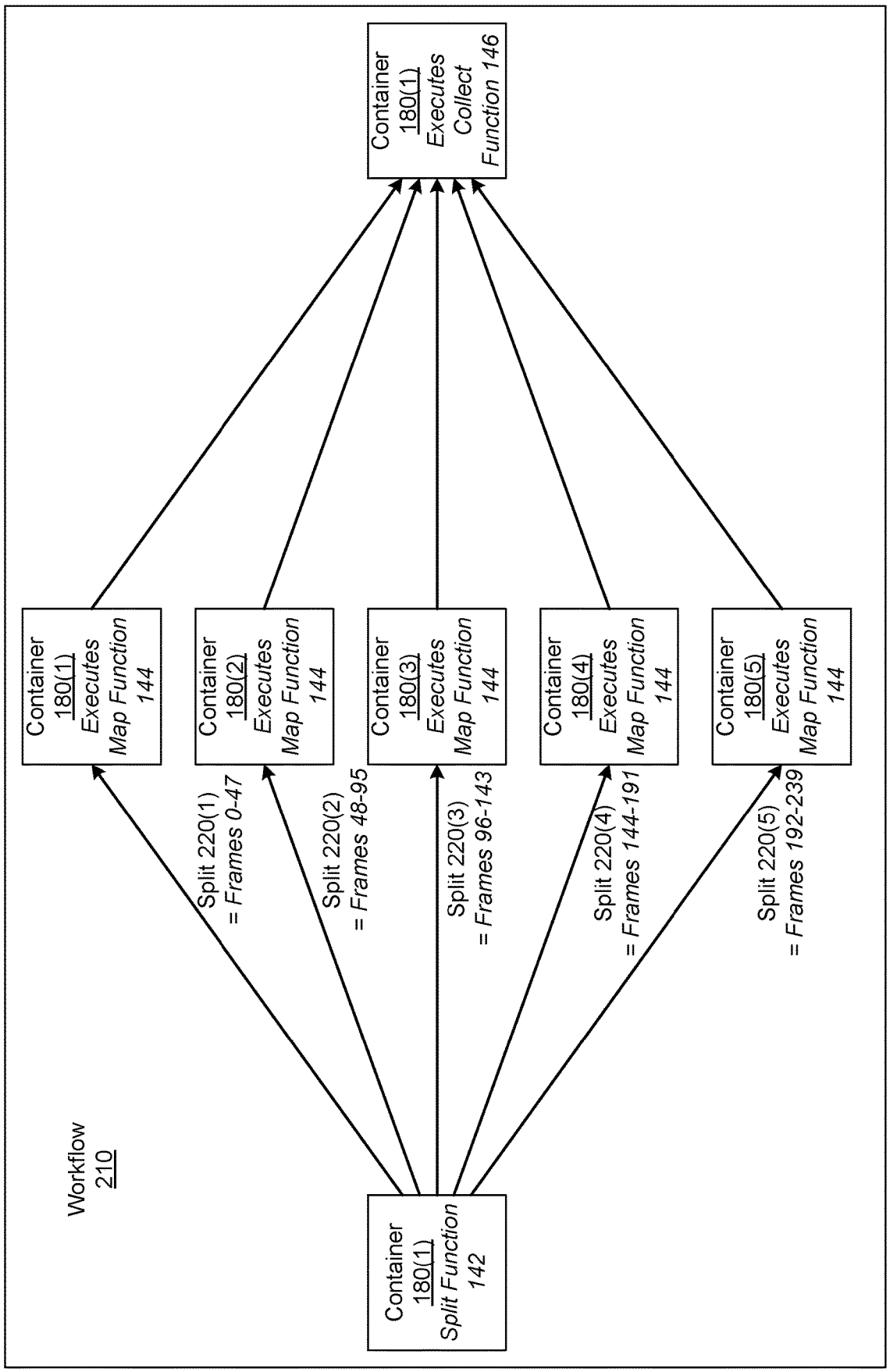
FIG. 2 illustrates a workflow established by the workflow engine of FIG. 1, according to various embodiments of the present invention.

FIG. 2 illustrates the workflow 210 established by the workflow engine 162 of FIG. 1, according to various embodiments of the present invention. Although not shown in FIG. 2, the workflow engine 162 executes the workflow 210 in response to the job request 190 specifying the container image 132(x) and the media item 196(y). For explanatory purposes only, the containers 180(1)-180(5) are associated with the container image 132(x), and the media item 196(y) is a video file.

As shown, the workflow 210 begins when the workflow engine 162 causes the platform agent 134 included in the container 180(1) to execute the split function 142 on the media item 196(y). The split function 142 generates a split specification file (not shown in FIG. 2) that specifies the splits 220(1)-220(5). The split 220(1) includes, without limitation, the frames 0-47 of the media item 196(y). The split 220(2) includes, without limitation, the frames 48-95 of the media item 196(y). The split 220(3) includes, without limitation, the frames 96-143 of the media item 196(y). The split 220(4) includes, without limitation, the frames 144-191 of the media item 196(y). The split 220(5) includes, without limitation, the frames 192-239 of the media item 196(y). In alternate embodiments, the split function 142 may partition any number of media item(s) 196 into any number of splits 220, and each split 220 may include a different number of media objects frames, channels, etc.).

After the split function 142 has finished executing, the workflow engine 162 causes the different instances of the platform agent 134 included in the containers 180(1)-180(5) to execute the associated instance of the map function 144 on, respectively, the splits 220(1)-220(5). Note that the containers 180(1)-180(5) may execute substantially in parallel with one another. After the map functions 144 have finished executing, the workflow engine 162 causes the container 180(1) to execute the collection function 146 to generate any number of final output files(s) (not shown). The final output file(s) are the consolidated results of executing the scalable media application 140 associated with the container image 132(x) on the media item 196(y).

Figure 3:
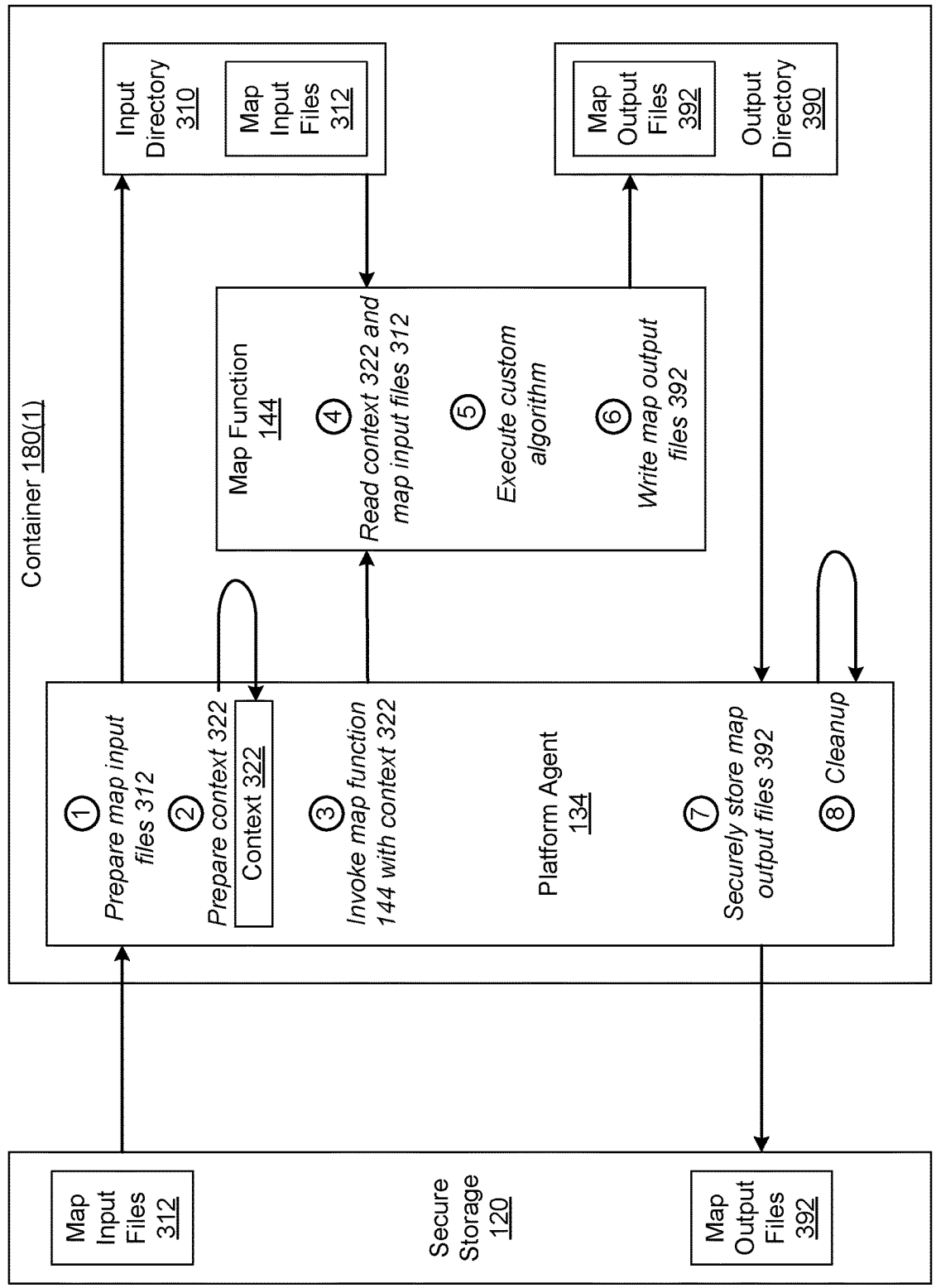
FIG. 3 illustrates how one of the containers of FIG. 2 executes a custom algorithm on a given split, according to various embodiments of the present invention.

FIG. 3 illustrates how one of the containers 180 of FIG. 2 executes a custom algorithm on a given split 220, according to various embodiments of the present invention. More specifically, FIG. 3 depicts the "map task operations" that the platform agent 134 and the map function 144 included in the container 180(1) execute on the split 220(1) in response to a map task specifying the split 220(1). Notably, the map function 144 incorporates the custom algorithm. For explanatory purposes only, FIG. 3 depicts the map task operations as a series of numbered bubbles.

First, as depicted with the bubble numbered 1, the platform agent 134 prepares map input files 312 for processing by the map function 144. As shown, the map input files 312 are included in the secure storage 120 that is made available to the map function 144 with a network mount solution. The map input files 312 describe, without limitation, the frames included in the split 220(1). As part of preparing the map input files 312, the platform agent 134 performs one or more operations (e.g., copy operations, mount operations, etc.) that enable the map input files 312 to be accessible to the container 180(1) via an input directory 310.

Subsequently, as depicted with the bubble numbered 2, the platform agent 134 prepares a context 322. Although not shown, the context 322 includes, without limitation, any amount and type of information required by the map function 144 to execute on the split 220(1). In particular, the context 322 specifies the location of the input directory 310, the location of an output directory 390, and any number of media attributes associated with the split 220(1). An example of a media attribute is frames per second. The platform agent 134 then invokes the map function 144 with the context 144 (bubble numbered 3).

As depicted with the bubble numbered 4, the map function 144 reads the context 322 and the map input files 312. The map function 144 then executes the custom algorithm that is incorporated into the map function 144 (bubble numbered 5). As depicted with the bubble numbered 6, the map function 144 writes any number of map output files 392 to the output directory 390. The map output files 392 are the results of executing the custom algorithm on the split 220(1).

After the map function 144 finishes executing and as depicted with the bubble numbered 7, the platform agent 134 stores the map output files 392 in the secure storage 120. Finally, as depicted with the bubble numbered 8, the platform agent 134 performs any number of cleanup operations. An example of a cleanup operation is deleting any temporary files and directories that the map function 144 created when processing the split 220(1).

Although not depicted in FIG. 3, prior to the map task operations depicted via the numbered bubbles 1-8, the platform agent 134 and the split function 142 included in the container 180(1) performed a similar sequence of operations to execute a split task. And, subsequent to the map task operations depicted via the numbered bubbles 1-8, the platform agent 134 and the collect function 146 included in the container 180(1) perform a similar sequence of operations to execute a collect task.

Figure 4:
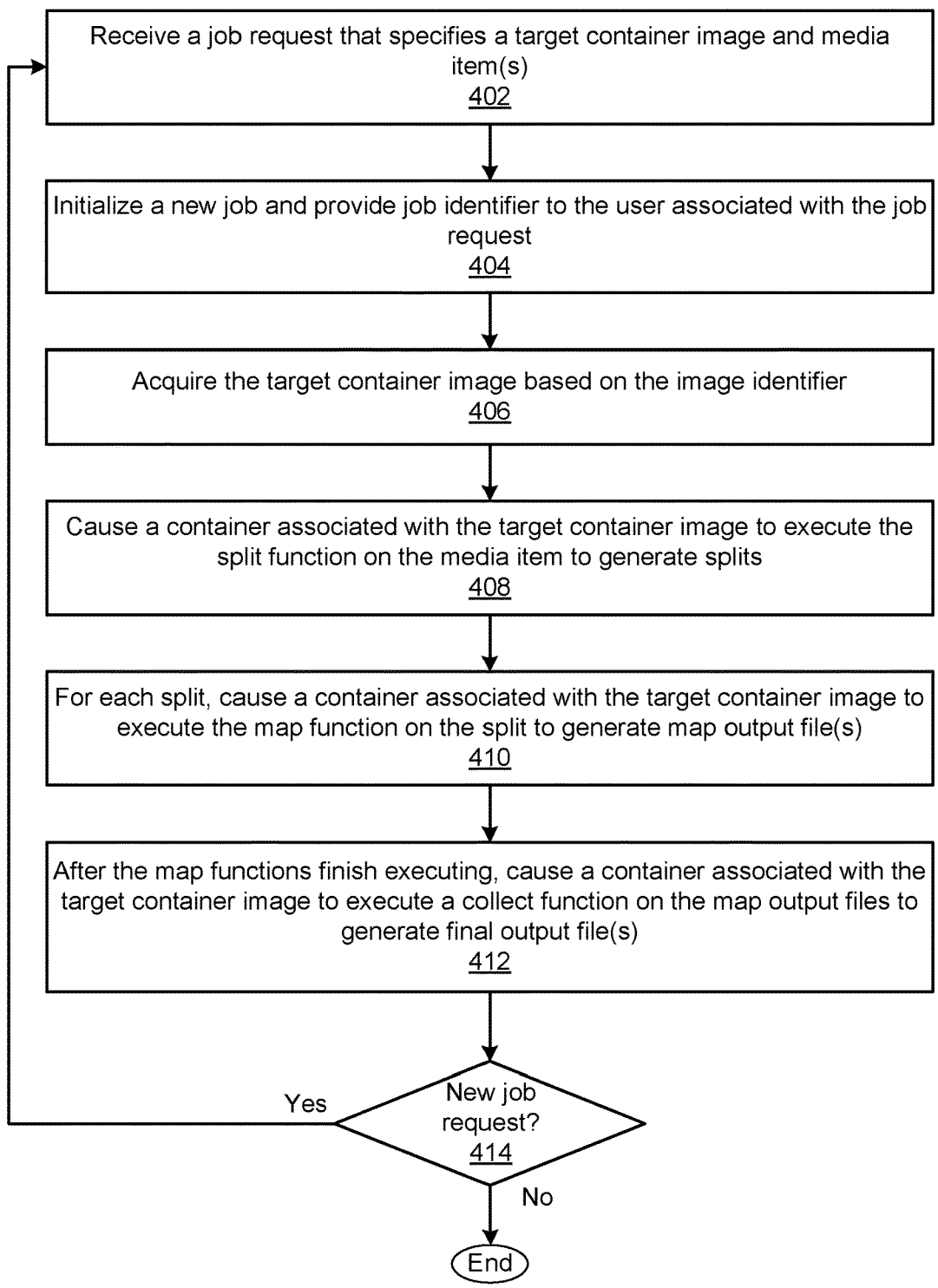
FIG. 4 is a flow diagram of method steps for executing custom algorithms on media items, according to various embodiments of the present invention.

FIG. 4 is a flow diagram of method steps for executing custom algorithms on media items, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the job interface engine 152 receives the job request 190 from a user. The job request 190 specifies, without limitation, the image identifier 192 and the media item identifier list 194. At step 404, the job interface engine 152 initializes a new job based on the job request 190 and transmits the associated job identifier 196 to the user. At step 406, the job interface engine 152 acquires a target container image 132 from the image registry 130 based on the image identifier 192. In alternate embodiments, the job interface engine 152 may acquire the target container image 132 in any technically feasible fashion based on any type of image identifier.

At step 408, the workflow engine 162 causes one of the containers 180 associated with the target container image 132 to execute the split function 142 on the media item(s) 196 specified via the media item identifier list 194 to generate the splits 220. At step 410, for each split 220, the workflow engine 162 causes a potentially different one of the containers 180 associated with the target container image 132 to execute the map function 144 on the split 220 to generate one or more map output files 392. At step 412, after the different instances of the map functions 144 finish executing on the splits 220, the workflow engine 162 causes one of the containers 180 associated with the target container image 132 to execute the collect function 146 on the map output files 292 associated with the different splits 220 to generate final output file(s). The final output file(s) may be used to perform at least one of an evaluation operation on, a modification operation on, and a representation operation with respect to the media item(s) 196 specified via the media item identifier list 194.

At step 414, the job interface engine 152 determines whether the job interface engine 152 has received a new job request 190. If, at step 414, the job interface engine 152 determines that the job interface engine 152 has received a new job request 190, then the method 400 returns to step 402, where the job interface engine 152 and the workflow engine 162 execute the new job request 190. If, however, at step 412, the job interface engine 152 determines that the job interface engine 152 has not received a new job request 190, then the method 400 terminates.

In sum, the disclosed techniques may be used to efficiently execute a custom algorithm on media content via distributed computing resources. The custom algorithm is incorporated into split, map, and collect functions included in a scalable media application. A platform agent implements "overhead" functionality. For instance, in various embodiments, the platform agent securely acquires media items from a media content library for a wide variety of media formats, automatically performs media processing operations such as encoding and decoding, and securely stores files in a secure storage. The platform agent, the scalable media application, and any dependencies of the scalable media application are included in a container image that is stored in an image registry. The custom algorithm is executed via a job request that specifies at least the container image and one or more media items.

Upon receiving a job request, a workflow engine executes a new job based on the job request and a split-map-collect workflow. First, the workflow engine generates a "split" task specifying the media item(s) associated with the job request. The workflow engine queues the task for execution by a container associated with the container image. If there are no containers associated with the container image, then an autoscaler causes available compute instance(s) to run the container image, thereby creating new container(s) that are associated with the container image. To execute the split task, the platform agent included in the container securely acquires the media item(s) and executes the split function on the media item(s). The split function partitions the media item(s) into splits and generates a split specification file that specifies the splits.

Upon determining that the split task has finished executing, the workflow engine generates a different "map" task for each of the splits specified in the split specification file. The workflow engine queues the map tasks for execution by the containers associated with the container image. In this fashion, the map tasks are distributed among any number of containers that are associated with the container image and dynamically managed by the autoscaler. To execute the map task for a particular split, the platform agent included in the container sets up the map input files associated with the split (e.g., the frames included in the split), executes the map function based on the map input files, and stores the map output file(s) generated by the map function in secure storage. Upon determining that all of the map tasks have finished executing, the workflow engine generates a "collect" task. The workflow engine queues the collect task for execution by a container associated with the container image. To execute the collect task, the platform agent included in the container sets up the map output files generated by the different map tasks, executes the map function based on the map output files, and stores the final output file(s) generated by the collect function in secure storage for further processing.

Advantageously, the disclosed techniques enable custom algorithms to be more easily and reliably executed on media items via distributed computing resources relative to prior art solutions. Notably, the workflow engine establishes a split-map-collect workflow that can execute custom algorithms on media data in a high-throughput fashion using automatically allocated containers that include the proper operating systems (OS) dependencies. In that regard, the amount of technical knowledge of dynamic workflows, resource allocation, and load balancing required to generate scalable media applications are reduced relative to prior art solutions. In addition, the disclosed techniques automatically perform media, communication, and security operations that reduce the amount of manual design effort and technical knowledge required to securely and successfully execute the custom algorithm on a wide range of potentially proprietary media items. These technical advantages provide one or more technological advancements over the prior art.

1. In some embodiments, a computer-implemented method comprises generating a plurality of split specifications based on a split function included in a container image, wherein each split specification is associated with a different portion of a media item; generating a plurality of map output files based on the plurality of split specifications and a map function included in the container image; and generating one or more final output files based on the plurality of map output files and a collect function included in the container image, wherein the one or more final output files are subsequently used to perform at least one of an evaluation operation on, a modification operation on, and a representation operation with respect to the media item.

2. The computer-implemented method of clause 1, wherein the container image includes a scalable media application and one or more operating system (OS) dependencies of the scalable media application.

3. The computer-implemented method of clause 1 or 2, further comprising performing one or more operations to determine that the plurality of map output files have been successfully generated.

4. The computer-implemented method of any of clauses 1-3, wherein generating the plurality of split specifications comprises acquiring a first container associated with the container image; causing the first container to securely acquire the media item from a media content library; and causing the first container to execute the split function on the media item.

5. The computer-implemented method of any of clauses 1-4, further comprising executing the container image on a compute instance included in a cloud or other distributed computing system to generate a first container included in a plurality of containers associated with the container image.

6. The computer-implemented method of any of clauses 1-5, wherein generating the plurality of map output files comprises, for each split specification included in the plurality of split specifications, causing a different container included in a plurality of containers associated with the container image to generate a different map output file included in the plurality of map output files based on the map function.

7. The computer-implemented method of any of clauses 1-6, wherein generating the one or more final output files comprises acquiring a first container associated with the container image and causing the first container to execute the collect function on the plurality of map output files.

8. The computer-implemented method of any of clauses 1-7, wherein the split function partitions a plurality of frames included in the media item based on playback time to generate the plurality of split specifications.

9. The computer-implemented method of any of clauses 1-8, wherein the map function incorporates a custom algorithm that operates on at least one of media content or encoded media content.

10. The computer-implemented method of any of clauses 1-9, wherein the collect function performs at least one of an encryption operation, a compression operation, and a byte concatenation operation on the plurality of map output files to generate the one or more final output files.

11. In some embodiments, one or more non-transitory computer readable media include instructions that, when executed by one or more processors, cause the one or more processors to perform the steps of generating a plurality of split specifications based on a split function included in a container image, wherein each split specification is associated with a different portion of a media item; for each split specification included in the plurality of split specifications, generating one or more different map output files included in a plurality of map output files based on the split specification and a map function included in the container image; and generating one or more final output files based on the plurality of map output files and a collect function included in the container image, wherein the one or more final output files are subsequently used to perform at least one of an evaluation operation on, a modification operation on, and a representation operation with respect to the media item.

12. The one or more non-transitory computer readable media of clause 11, wherein the container image includes a scalable media application and one or more operating system (OS) dependencies of the scalable media application.

13. The one or more non-transitory computer readable media of clauses 11 or 12, wherein the map function operates on a media-related object as a first class object.

14. The one or more non-transitory computer readable media of any of clauses 11-13, wherein generating the plurality of split specifications comprises transmitting a task request to a task engine that, in response, acquires a first container associated with the container image, and causes the first container to execute the split function on an uncompressed and decoded version of the media item.

15. The one or more non-transitory computer readable media of any of clauses 11-14, further comprising executing the container image on a compute instance included in a cloud or other distributed computing system to generate a first container included in a plurality of containers associated with the container image.

16. The one or more non-transitory computer readable media of any of clauses 11-15, wherein generating the plurality of map output files comprises causing a first container associated with the container image to determine a first plurality of frames included in the media item based on a first split specification included in the plurality of split specifications; causing the first container to execute the map function on the first plurality of frames to generate a first map output file included in the plurality of map output files; causing a second container associated with the container image to determine a second plurality of frames included in the media item based on a second split specification included in the plurality of split specifications; and causing the second container to execute the map function on the second plurality of frames to generate a second map output file included in the plurality of map output files.

17. The one or more non-transitory computer readable media of any of clauses 11-16, wherein generating the one or more final output files comprises acquiring a first container associated with the container image and causing the first container to execute the collect function on the plurality of map output files.

18. The one or more non-transitory computer readable media of any of clauses 11-17, wherein each split specification is associated with a different shot sequence included in the media item.

19. The one or more non-transitory computer readable media of any of clauses 11-18, wherein the media item comprises at least one of video content, encoded video content, audio content, encoded audio content, and text content.

20. In some embodiments, a system comprises one or more memories storing instructions; and one or more processors that are coupled to the one or more memories and, when executing the instructions, are configured to generate a plurality of split specifications based on a split function included in a container image, wherein each split specification is associated with a different portion of media content; generate a plurality of map output files based on the plurality of split specifications and a map function included in the container image; perform one or more operations to determine that the plurality of map output files have been successfully generated; and generate one or more final output files based on the plurality of map output files and a collect function included in the container image, wherein the one or more final output files are subsequently used to perform at least one of an evaluation operation on, a modification operation on, and a representation operation with respect to the media content.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
generating a plurality of split specifications based on a split function included in a container image, wherein the split function partitions a media item based on playback time to generate the plurality of split specifications, and each split specification is associated with a different portion of the media item;
generating a plurality of map output files based on the plurality of split specifications and a map function included in the container image; and
generating one or more final output files based on the plurality of map output files and a collect function included in the container image, wherein the one or more final output files are subsequently used to perform at least one of an evaluation operation on, a modification operation on, and a representation operation with respect to the media item.

2. The computer-implemented method of claim 1, wherein the container image includes a scalable media application and one or more operating system (OS) dependencies of the scalable media application.

3. The computer-implemented method of claim 1, further comprising performing one or more operations to determine that the plurality of map output files have been successfully generated.

4. The computer-implemented method of claim 1, wherein generating the plurality of split specifications comprises:
acquiring a first container associated with the container image;
causing the first container to securely acquire the media item from a media content library; and
causing the first container to execute the split function on the media item.

5. The computer-implemented method of claim 1, further comprising executing the container image on a compute instance included in a cloud or other distributed computing system to generate a first container included in a plurality of containers associated with the container image.

6. The computer-implemented method of claim 1, wherein generating the plurality of map output files comprises, for each split specification included in the plurality of split specifications, causing a different container included in a plurality of containers associated with the container image to generate a different map output file included in the plurality of map output files based on the map function.

7. The computer-implemented method of claim 1, wherein generating the one or more final output files comprises acquiring a first container associated with the container image and causing the first container to execute the collect function on the plurality of map output files.

8. The computer-implemented method of claim 1, wherein the split function partitions a plurality of frames included in the media item.

9. The computer-implemented method of claim 1, wherein the map function incorporates a custom algorithm that operates on at least one of media content or encoded media content.

10. The computer-implemented method of claim 1, wherein the collect function performs at least one of an encryption operation, a compression operation, and a byte concatenation operation on the plurality of map output files to generate the one or more final output files.

11. One or more non-transitory computer readable media including instructions that, when executed by one or more processors, cause the one or more processors to perform the steps of:
generating a plurality of split specifications based on a split function included in a container image, wherein the split function partitions a media item based on playback time to generate the plurality of split specifications, and each split specification is associated with a different portion of the media item;
for each split specification included in the plurality of split specifications, generating one or more different map output files included in a plurality of map output files based on the split specification and a map function included in the container image; and
generating one or more final output files based on the plurality of map output files and a collect function included in the container image, wherein the one or more final output files are subsequently used to perform at least one of an evaluation operation on, a modification operation on, and a representation operation with respect to the media item.

12. The one or more non-transitory computer readable media of claim 11, wherein the container image includes a scalable media application and one or more operating system (OS) dependencies of the scalable media application.

13. The one or more non-transitory computer readable media of claim 11, wherein the map function operates on a media-related object as a first class object.

14. The one or more non-transitory computer readable media of claim 11, wherein generating the plurality of split specifications comprises transmitting a task request to a task engine that, in response, acquires a first container associated with the container image, and causes the first container to execute the split function on an uncompressed and decoded version of the media item.

15. The one or more non-transitory computer readable media of claim 11, further comprising executing the container image on a compute instance included in a cloud or other distributed computing system to generate a first container included in a plurality of containers associated with the container image.

16. The one or more non-transitory computer readable media of claim 11, wherein generating the plurality of map output files comprises:
    causing a first container associated with the container image to determine a first plurality of frames included in the media item based on a first split specification included in the plurality of split specifications;
    causing the first container to execute the map function on the first plurality of frames to generate a first map output file included in the plurality of map output files;
    causing a second container associated with the container image to determine a second plurality of frames included in the media item based on a second split specification included in the plurality of split specifications; and
    causing the second container to execute the map function on the second plurality of frames to generate a second map output file included in the plurality of map output files.

17. The one or more non-transitory computer readable media of claim 11, wherein generating the one or more final output files comprises acquiring a first container associated with the container image and causing the first container to execute the collect function on the plurality of map output files.

18. The one or more non-transitory computer readable media of claim 11, wherein each split specification is associated with a different shot sequence included in the media item.

19. The one or more non-transitory computer readable media of claim 11, wherein the media item comprises at least one of video content, encoded video content, audio content, encoded audio content, and text content.

20. A system, comprising:
    one or more memories storing instructions; and
    one or more processors that are coupled to the one or more memories and, when executing the instructions, are configured to:
        generate a plurality of split specifications based on a split function included in a container image, wherein the split function partitions media content based on playback time to generate the plurality of split specifications, and each split specification is associated with a different portion of the media content;
        generate a plurality of map output files based on the plurality of split specifications and a map function included in the container image;
        perform one or more operations to determine that the plurality of map output files have been successfully generated; and
        generate one or more final output files based on the plurality of map output files and a collect function included in the container image, wherein the one or more final output files are subsequently used to perform at least one of an evaluation operation on, a modification operation on, and a representation operation with respect to the media content.

* * * * *